Figure 1:
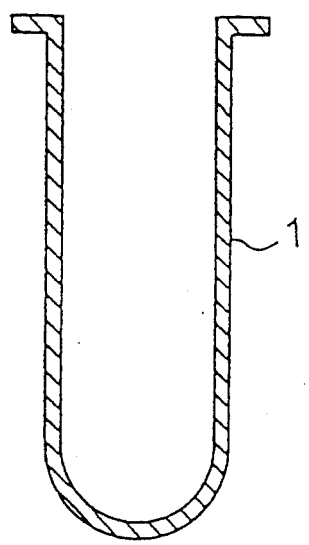

United States Patent [19]

Dohi et al.

[11] Patent Number: 5,135,893
[45] Date of Patent: Aug. 4, 1992

[54] CARBONACEOUS CERAMIC COMPOSITE FOR USE IN CONTACT WITH MOLTEN NONFERROUS METAL

[75] Inventors: Shoji Dohi, Suita; Akio Nakashiba, Katano; Kengo Hamada, Matsubara; Shigenobu Yurugi, Osaka; Hiroshi Sano, Izumi; Yoshitaka Hayashi, Osaka; Akira Nishihira, Daito; Hirokazu Asada, Higashiosaka; Mineyoshi Nishinou, Higashiosaka; Mamoru Imajo, Higashiosaka, all of Japan

[73] Assignee: Osaka Gas Company Limited, Tokyo, Japan

[21] Appl. No.: 613,880

[22] PCT Filed: Dec. 26, 1989

[86] PCT No.: PCT/JP89/01304
§ 371 Date: Nov. 30, 1990
§ 102(e) Date: Nov. 30, 1990

[87] PCT Pub. No.: WO90/11981
PCT Pub. Date: Oct. 18, 1990

[30] Foreign Application Priority Data

Mar. 30, 1989 [JP] Japan ............................... 1-81265

[51] Int. Cl.⁵ ..................... C04B 35/52; C04B 35/56

[52] U.S. Cl. ................................. 501/91; 501/88; 501/90; 501/92; 501/96; 501/97; 126/360 R; 126/366; 126/367

[58] Field of Search ..................... 501/87, 88, 90, 91, 501/92, 96, 97, 99; 126/360 R, 366, 367

[56] References Cited

U.S. PATENT DOCUMENTS

| | | | |
|---|---|---|---|
| 4,336,213 | 6/1982 | Watanabe et al. | 264/65 |
| 4,518,702 | 5/1985 | Yoshida et al. | 501/90 |
| 4,668,452 | 5/1987 | Watanabe et al. | 264/63 |
| 4,690,909 | 1/1987 | Okuno et al. | 501/90 |
| 4,701,426 | 10/1987 | Okuno et al. | 501/90 |

Primary Examiner—William R. Dixon, Jr.
Assistant Examiner—Michael Marcheschi
Attorney, Agent, or Firm—Larson and Taylor

[57] ABSTRACT

This invention provides a carbon-containing ceramic composite for molten non-ferrous metal, the composite being a sintered ceramic body to be used in contact with molten non-ferrous metal, the sintered body containing an aggregate of silicon carbide and/or silicone nitride, the sintered body being characterized in that it comprises, (a) 100 parts by weight of the aggregate,
(b) 5 to 45 parts by weight of flake graphite, and
(c) boron carbide in an amount of 10 to 40% by weight based on the flake graphite.

5 Claims, 3 Drawing Sheets

F I G. 4
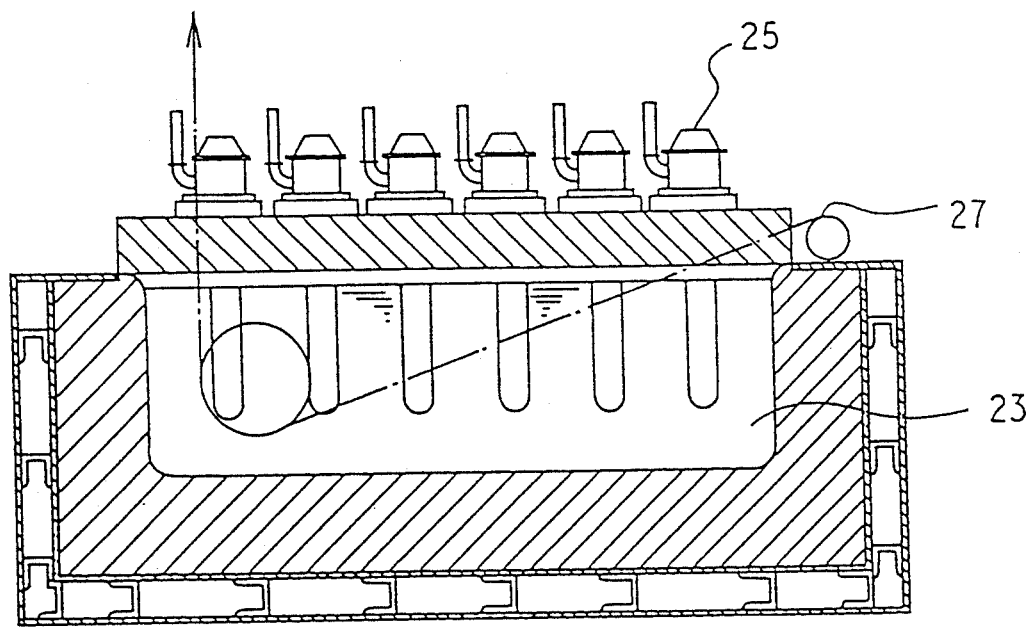

CARBONACEOUS CERAMIC COMPOSITE FOR USE IN CONTACT WITH MOLTEN NONFERROUS METAL

FIELD OF THE INVENTION

The present invention relates to a sintered carbon-containing ceramic body to be used in contact with molten aluminum, zinc, copper, lead or like non-ferrous metals; a protecting tube made of such ceramic material for a thermocouple, a heater or the like which tube is used as immersed in molten metal; a transport pipe made of such ceramic material for transporting molten metal; an immersion-type heater for molten non-ferrous metal which is provided with the protecting ceramic tube as an outer tube; a furnace for melting non-ferrous metal which is provided with such heater; etc.

PRIOR ART AND ITS PROBLEMS

A furnace adapted to melt and hold aluminum or like non-ferrous metal needs a heater for heating molten metal, a thermocouple for measuring the temperature of molten metal, etc. Protecting tubes of ceramics are used for the protection of these devices. A protecting tube for a heater which is used as immersed in molten metal (hereinafter referred to as "heater tube"), for example, is required to have a function of transferring the heat generated by the heater inside the tube to the molten metal outside the tube. Therefore generally the internal surface of the heater tube has a relatively higher temperature than the outside surface thereof in contact with the molten metal. As a result, minute fissures are formed on the outside surface of the heater tube due to the difference of thermal stress between the internal and outside surfaces of the tube so that the interior of the tube becomes easily permeable, thereby tending to accelerate the progressive erosion of the heater tube in its entirety. Especially when molten aluminum is involved, its reducing ability is extremely high and the permeability of the tube and its susceptibility to erosion are increased with the rise of the temperature so that the tube becomes more easily eroded. Heretofore chiefly employed are heater tubes produced using silicon carbide interlinked with silicon nitride as an aggregate which has a poor wetting property on and a low chemical affinity with molten aluminum. This type of heater tube can be produced by feeding nitrogen while heating shaped bodies comprising a silicon carbide aggregate and silicon to react the nitrogen with the silicon through the pores in the shaped bodies for production of silicon nitride. However, having the pores, the obtained heater tube is not given a compact and uniform texture, and is increased in the wetting property against aluminum with the lapse of time, permitting the penetration and erosion of molten metal.

A method for production of a compactly and uniformly textured heater tube is conceivable which comprises shaping a mixture of a silicon carbide aggregate, silicon and carbon (or an organic substance as a carbon source) under a high pressure and reacting the silicon with the carbon (or the carbon source) with heating to produce silicon carbide. While the heater tube produced by this method has a slightly improved durability, no great improvement is achieved to make up for the disadvantage of the complicated method.

MEANS FOR SOLVING THE PROBLEMS

The present inventors conducted extensive research in view of such state of the art. In the course of the research, the inventors found the following. In conventional heater tubes, great importance has been attached to the erosion due to the penetration of molten metal, and consideration has been given mainly to measures for obviating the problem. Actually the durability of heater tubes, however, depends largely on the thermal spalling attributable to cracks or minute cracks formed due to the thermal stress in the early stage of use. The inventors continued the research to find out optimum materials for heater tubes, considering also the destruction by thermal stress. As a result, the inventors successfully produced heater tubes and like protecting tubes which are composed of an aggregate of silicon carbide and/or silicon nitride and specified amounts of flake graphite and boron carbide, and which are excellent in not only the chemical durability but the mechanical durability, thermal conductivity, and an ability to reduce the thermal stress generated with the increase of thermal conductivity.

According to the present invention, there are provided the following ceramic composite and products produced from the composite:

(1) a carbon-containing ceramic composite for molten non-ferrous metal, the composite being a sintered ceramic body to be used in contact with molten nonferrous metal, the sintered body containing an aggregate of silicon carbide and/or silicon nitride, the sintered body being characterized in that it comprises,
  (a) 100 parts by weight of the aggregate,
  (b) 5 to 45 parts by weight of flake graphite, and
  (c) boron carbide in an amount of 10 to 40% by weight based on the flake graphite;

(2) a protecting tube for molten non-ferrous metal, the tube being made of the carbon-containing ceramic composite defined above in item (1);

(3) a pipe for molten non-ferrous metal, the pipe being made of the carbon-containing ceramic composite defined above in item (1);

(4) an immersion-type heater for molten non-ferrous metal which is provided with the protecting tube, as an outer tube, made of the carbon ceramic composite as defined above in item (1);

(5) a furnace for melting non-ferrous metal which is provided with a heater including the protecting tube, as an outer tube, made of the carbon-containing ceramic composite as defined above in item (1).

Described below are the reasons for specifying the components for use in the invention and the proportions of the components used. So remarkable is the result which is attainable by the synergetic effect of the components (b) and (c) on the aggregate (a) that the relationship between the ratio of components and the attained result can not necessarily be so simplified as described hereinafter. This should be noted in advance.

The aggregate to be used in the invention is at least one of silicon carbide and silicon nitride. The particle size of the aggregate is determined mainly according to the wall thickness of the sintered ceramic body and is not specifically limited. The particles of the aggregate are classified into coarse, medium-size and fine particles among which usually the largest-size particles have a size corresponding to about 1/5 to about 1/10 the wall thickness of sintered body. The particle size distribution for obtaining the most compact texture is selected. A suitable combination of coarse, medium-size and fine aggregate particles is used, of course, in the invention, as commonly done in the art.

In the invention, 5 to 45 parts of flake graphite is used per 100 parts of the above aggregate (the parts and percentages appearing hereinafter are all by weight). When less than 5 parts of the flake graphite is used per 100 parts of the aggregate, satisfactory improvements are not achieved in the resistance to thermal spalling and the resistance to erosion. On the other hand, use of over 45 parts of the flake graphite increases the bulk of the sintered body and facilitates the rapid progress of oxidation. As to the particle size of flake graphite, generally coarse particles thereof are effective in improving the properties of the sintered body. Yet it is usually preferred to use particles of about 20 to about 100 mesh which are easily available. When artificial graphite is used in the invention instead of flake graphite having a high degree of crystallization, the properties of the sintered ceramic body can not be much improved because of facilitated progress of oxidation.

Further, it is essential in the invention to use boron carbide in an amount of 10 to 40% based on the flake graphite. Boron carbide can not easily achieve wetting on molten non-ferrous metal, and has a high resistance to attack by fused aluminum. Boron carbide exhibits other properties in the invention. Stated more specifically, when a binder is added to a mixture of flake graphite and an aggregate of silicon carbide and/or silicon nitride in a conventional manner, the subsequent shaping and sintering of the resulting mass provides a sintered body with no compact texture and with a low strength, because the flake graphite has a poor wetting property on the binder. However, the present inventors' research revealed that when the above mixture further contains a specific amount of boron carbide, the texture of the sintered body becomes compacted and the strength thereof is remarkably improved. It was also discovered that even when a sintered body being used as dipped in molten metal is, for example, partly spalled, the boron carbide is oxidized to boron oxide which forms a borosilicate-type vitreous phase covering the surface of the sintered body, thereby enabling the prevention of oxidation. If the amount of boron carbide is less than 10% of flake graphite, the effect anticipated by its use is not fully produced, whereas use of boron carbide in an amount of more than 40% thereof results in not only incurring of higher production costs, but ready formation of cracks and deformations during the production of sintered body, particularly during firing. The particle size of boron carbide is up to about 325 mesh substantially corresponding to that of the fine aggregate particles, preferably for attempting to achieve compactest packing. If boron oxide per se is used in place of boron carbide in the invention, the properties of the sintered body are impaired because a large amount of moisture is absorbed in the production of sintered body because of the high hygroscopicity of the oxide.

For preparation of the sintered ceramic body according to the invention, a conventional binder is added to a mixture of silicon carbide and/or silicon nitride, flake graphite and boron carbide in the specified ratio, and the resulting mass is uniformly kneaded, shaped and fired in a conventional manner.

Useful binders can be any of those heretofore known and are not specifically limited. Specific examples of such binders are tar, pitch, furan resin, phenolic resin, furfuryl alcohol and like organic binders; cellulose, dextrin, lignin, alginate, acrylate and like organic adhesives; aluminum phosphate and like phosphates, sodium silicate and like silicates, silica sol, alumina sol, zirconia sol and like sols, kaolin and like refractory clays, and other inorganic binders; etc. These binders are used in the form of an aqueous solution, an aqueous dispersion, a solvent-based solution or the like according to the properties of the binder. These techniques are well known and thus a detailed description thereof is omitted. Metal silicon, ferrosilicon, ferroboron, silumin, metal zirconium or like metals or alloy powders may be used for the formation of metal carbide by the reaction with the residual carbon in the sintered body or with $CO_2$ in the atmosphere or for the formation of metal nitride by the reaction with $N_2$ in the atmosphere.

The kneaded mass is shaped by conventional methods, such as cold isostatic press (CIP) method, slip casting method, vibratory forming method, etc. and is fired as placed or embedded in the non-oxidizing atmosphere and/or coke breeze at a temperature of usually 1100° to 1410° C., whereby the desired sintered body is obtained.

With reference to the accompanying drawings, a brief description is given below on the protecting tube for molten non-ferrous metal; the heater for molten non-ferrous metal which is provided with the protecting tube; and the furnace for melting non-ferrous metal which is provided with the heater, according to the present invention. The following description is directed chiefly to the related parts of the present invention and omits conventional parts which are not especially required.

FIG. 1 is a cross section view showing an example of a protecting tube 1 for molten non-ferrous metal according to the invention.

Figure 2:
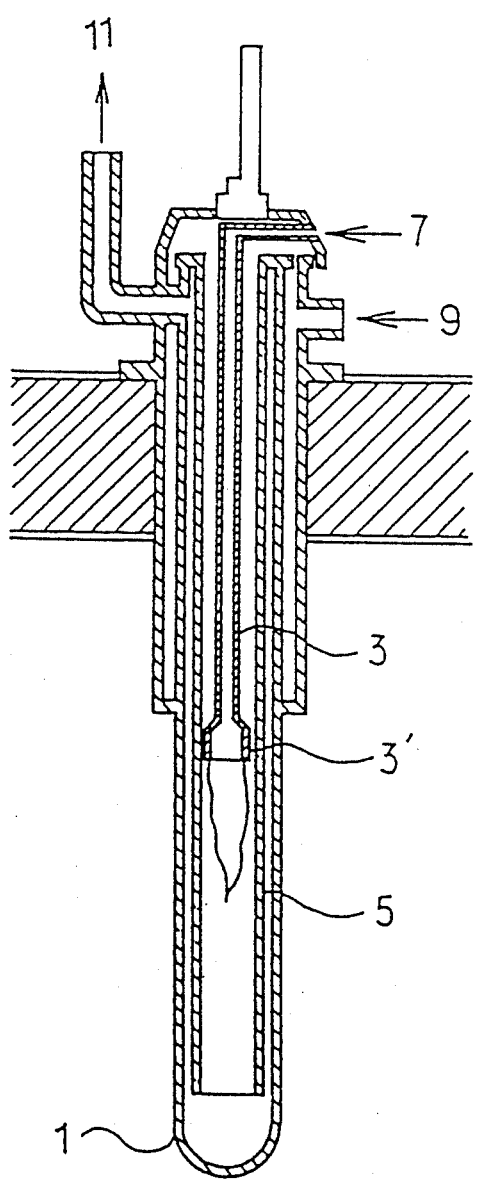

FIG. 2 is a cross section view of an example of the immersion-type heater for molten non-ferrous metal according to the invention. The protecting tube is adapted to protect an inner tube 5 made of heat-resistant material for guiding a burner 3 and combustion gas. In the heater, a gaseous fuel (city gas, etc.) flowing from an inlet 7 is burnt at a burner top 3' with the aid of air sent from an inlet 9. The gaseous fuel flows upward from the lower end of the inner tube 5, passes through a space between the inner tube 5 and the protecting tube 1 and is discharged as an exhaust gas from an exhaust port 11. Meanwhile in the furnace for melting non-ferrous metal, the molten metal is heated through the tube wall of the protecting tube 1. Usable as a heat source for the heater shown in FIG. 2 are a liquid fuel, electricity and the like as well as the gaseous fuel.

There is no restriction on the inner tube 5 as to its shape, size, structure, etc. For example, a structure comprising a cylinder with numerous openings may be used. The length of the inner tube 5 is also optional. The immersion-type heater for molten non-ferrous metal as shown in FIG. 2 can dispense with the inner tube 5 when so required.

When electricity is used as a heat source, a useful structure is such that an electric heater connected to a terminal wire is inserted in the protecting tube 1 and is heated by passage of an electric current. That is to say, the fuel inlet 7, air inlet 9 and exhaust port 11 are not needed, unlike the structure using a gaseous fuel or a liquid fuel.

Figure 3:
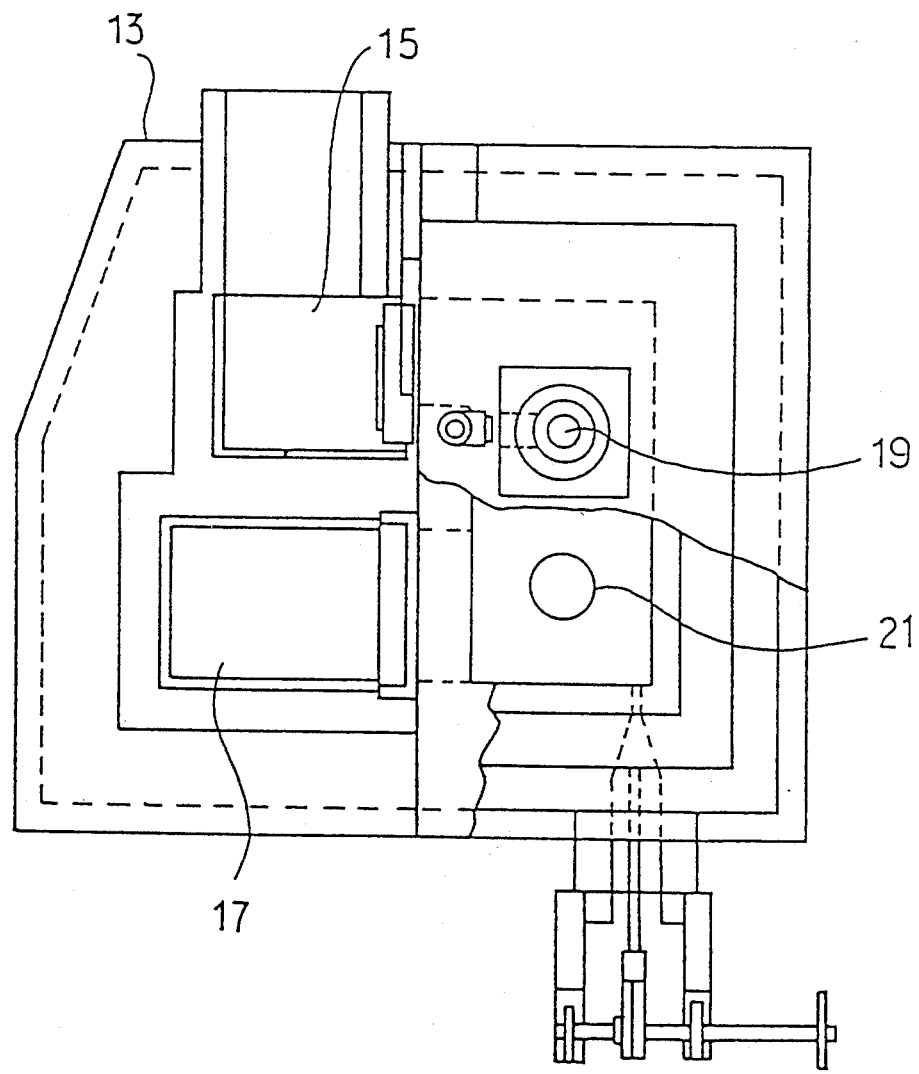

FIG. 3 is a plan view partly broken away which shows an example of a furnace for melting and holding aluminum as a non-ferrous metal. A furnace wall 13 and a floor are made of refractory heat-insulating materials.

A heat-retaining tank 23 communicating with an injection chamber 15 and a withdrawal chamber 17 are provided with heaters 19, 21, respectively. These heaters may be arranged in a perpendicular direction, or alternatively in an oblique or horizontal direction. The number of heaters arranged are determined according to the volume of molten metal. Molten aluminum is poured into the injection chamber 15 and is drawn from the withdrawal chamber 17 by a ladle or by a pump in a conventional manner. The molten metal thus drawn is conveyed through a pipe for molten non-ferrous metal to a die casting machine.

FIG. 4 is a cross section view showing an example of a furnace for plating wires with zinc as non-ferrous metal. The illustrated furnace is substantially identical with the furnace for melting aluminum as shown in FIG. 3 in respect of the structure and materials of the furnace, the number of heaters, and the arrangement thereof except that the furnace substantially consists of a heat-retaining tank 23 and has neither an injection chamber nor a withdrawal chamber. A wire 27 is heated in a conventional manner by a heater 25, and passed through the heat-retaining tank 23 wherein the surface of the wire 27 is plated with zinc.

It goes without saying that all types of conventional furnaces for melting non-ferrous metal can be the subject of the invention insofar as the protecting tube 1 of the invention is used.

EFFECTS OF THE INVENTION

The sintered ceramic body of the present invention is excellent in the durability against the mechanical spalling due to rapid thermal stress as well as in the resistance to chemical attack on molten metal. Further, the sintered body of the invention is outstanding in the thermal conductivity and the ability to reduce the thermal stress arising from the increase of thermal conductivity, which are important for the materials capable of transferring heat. Therefore, the sintered body of the invention is very useful as materials which are used as immersed in molten metal.

EXAMPLES

Examples are given below to clarify the features of the present invention in greater detail.

EXAMPLE 1

Sintered bodies were prepared by the following method using the components as shown below in Table 1.

First, the powdery components, not the liquid components (tar pitch and silica sol), were thoroughly mixed together and the liquid components were added thereto. The mixture thus obtained was fully kneaded. The kneaded mixture was molded at a pressure of 800 kg/cm$^2$, giving a molded product 100 mm in diameter and 150 mm in height. In this way, three molded products were prepared from each mixture.

Thereafter the molded products were embedded in coke breeze, heated in a tunnel-shaped kiln of the gas combustion type to 1350° C. at an average rate of 10° C./hour and maintained at this temperature for 12 hours, whereby the molded products were sintered.

TABLE 1

| Components | 1 | 2 | 3 | 4 | 5 | 6 | 7 | 8 | 9 | 10 | 11 | Conventional product |
|---|---|---|---|---|---|---|---|---|---|---|---|---|
| Aggregate | | | | | | | | | | | | |
| I | 100 | 100 | 100 | 100 | 100 | 100 | 80 | 100 | 100 | 100 | 100 | |
| II | | | | | | | 20 | | | | | |
| III | 0 | 10 | 10 | 10 | 20 | 20 | 20 | 40 | 50 | 10 | | Silicon carbide |
| IV | | | | | | | | | | | 40 | |
| V | 2 | 0 | 0.5 | 1 | 4 | 4 | 4 | 5 | 10 | 5 | 5 | |
| I + II/III | | 100/10 | 100/10 | 100/10 | 100/20 | 100/20 | 100/20 | 100/40 | 100/50 | 100/10 | 100/40 | 0/0 |
| III/V | 0/2 | 100/0 | 100/5 | 100/10 | 100/20 | 100/20 | 100/20 | 100/12.5 | 100/20 | 100/50 | 100/12.5 | 0/0 |
| Binder | | | | | | | | | | | | |
| VI | 4 | 5 | 5 | 5 | 6 | | 6 | 7 | 8 | 5 | 7 | |
| VII | 12 | 15 | 15 | 15 | 18 | | 18 | 21 | 24 | 15 | 23 | Silicon nitride |
| VIII | | | | | | 10 | | | | | | |
| IX | | | | | | 7 | | | | | | |
| Bonding type | Silicon carbide-bonding type | 15 | 15 | 15 | 18 | Silicate-bonding type | Silicon carbide-bonding type | 21 | 24 | 15 | 23 | Silicon nitride-bonding type |

In Table 1, the details of the materials designated I to IX are as follows.

I. Silicon carbide: purity of 98%, particle size of up to 60 mesh
II. Silicon nitride: purity of 99%, particle size of up to 60 mesh
III. Flake graphite: purity of 85%, particle size of 20 to 100 mesh
IV. Artificial graphite: purity of 95%, particle size of 20 to 100 mesh
V. Boron carbide: purity of 98%, particle size of up to 325 mesh
VI. Metal silicon: purity of 98%, particle size of up to 325 mesh
VII. Tar pitch: a mixture of tar and pitch in a ratio of 1:1
VIII. Elutriation kibushi clay: refractoriness: SK34, particle size of up to 325 mesh
IX. Aqueous solution of silica sol: SiO$_2$ at a concentration of 30%

Next, the thermal conductivity of three sintered bodies formed from each mixture was measured and the average value of the measurements was determined.

A cube (80 mm × 80 mm × 80 mm) was cut out from one of the three sintered bodies. Commercially available borosilicate frit particles slurried with silica sol was applied to the cube to a film thickness of about 1 mm and dried at 110° C. The vitreous layer was formed to prevent the progress of oxidation of the test specimens during the following tests. A quick heating-quick cooling cycle was repeated 15 times, one cycle consisting of placing the test specimen into an electric furnace heated at 1200° C., maintaining the specimen in the furnace for 20 minutes, withdrawing the specimen from the furnace and air-cooling the same. Thereafter the spalling resistance of the test specimen was evaluated according to the presence or absence of cracking, the degree of the cracking and the like at the surface of the test specimen.

Three test specimens were cut in the form of a square pillar (15 mm × 15 mm × 120 mm) from another sintered body. Then the apparent porosity of test specimens was determined according to JIS R 2205. These specimens were further tested for the bending strength according to JIS R 2213.

Two cylinders 70 mm in height were cut out from the remaining one sintered body. The cylinders were each hollowed out to make crucible-like cylinders having a bottom portion and a side wall each having a thickness of 20 mm. Thereafter the same vitreous layer as formed in the test specimen for resistance to spalling was produced on the surface of the hollow cylinders. The hollow cylinders were internally filled with a magnesium-containing aluminum alloy (JIS H 5320, AC7B alloy) and heated to 1000° C. at a rate of 20° C./min. One of the hollow cylinders was maintained at the same temperature for 50 hours and the other was maintained at the same temperature for 450 hours to conduct an erosion test. After the test, the hollow cylinder was cut into halves and the section of the cut portion was observed under a magnifying glass to measure the maximum permeation depth of the aluminum alloy. Further, the aluminum alloy adhering to the internal surface of the hollow cylinder was partly peeled off using a pair of tweezers to evaluate the degree of the spread of permeated aluminum alloy (ratio of the area of the spread of the alloy unpeeled due to the permeation to the area of the hollow cylinder surface portion contacted with the molten metal).

Table 2 shows the test results.

TABLE 2

| | | No. 1 | No. 2 | No. 3 | No. 4 | No. 5 | No. 6 |
|---|---|---|---|---|---|---|---|
| Bending strength (kg/cm$^2$) | | 300 | 190 | 220 | 270 | 320 | 250 |
| Apparent porosity (%) | | 16.5 | 24.8 | 23.4 | 21.9 | 22.5 | 22.2 |
| Thermal conductivity (Kcal/mHr °C.) | | 14 | 15 | 15 | 18 | 23 | 20 |
| Results of test for resistance to thermal spalling | Occurrence of cracking | Many cracking occurred | No cracking | 15 | 18 | 23 | 20 |
| | Evaluation | C | A | A | A | A | A |
| Results of test for resistance to attack by aluminum | After 50 hours Appearance, Spread of permeation | About ⅓ portion permeated | About ⅓ portion permeated on oxidation | No permeation | A | A | A |
| | Maximum depth of permeation | Up to 1 mm | 1 mm | Up to 1 mm | 0 mm | 0 mm | 0 mm |
| | Evaluation | B | C | B | A | A | A |
| | After 450 hours Appearance, Spread of permeation | Wholly permeated | Wholly permeated on oxidation | About ⅓ portion permeated on oxidation | No permeation | A | A |
| | Maximum depth of permeation | 2 mm | 3 mm | 2 mm | 0 mm | 0 mm | 0 mm |
| | Evaluation | C | C | C | A | A | A |
| Overall evaluation for resistances | | C | C | B | A | A | A |

| | | No. 7 | No. 8 | No. 9 | No. 10 | No. 11 | Conventional products |
|---|---|---|---|---|---|---|---|
| Bending strength (kg/cm$^2$) | | 320 | 300 | 260 | 340 | 230 | 440 |
| Apparent porosity (%) | | 22.9 | 22.7 | 24.1 | 22.5 | 24.8 | 16.0 |
| Thermal conductivity (Kcal/mHr °C.) | | 22 | 26 | 28 | 16 | 21 | 12 |
| Results of test for resistance to thermal spalling | Occurrence of cracking | No cracking | 26 | 28 | 16 | 21 | Many cracking occurred |
| | Evaluation | A | A | A | A | A | C |
| Results of test for resistance to attack by aluminum | After 50 hours Appearance, Spread of permeation | No permeation | A | Slightly permeated on oxidation | Slightly permeated by cracking | Slightly permeated on oxidation | Slightly permeated |
| | Maximum depth of permeation | 0 mm | 0 mm | 1 mm | 1–2 mm | 1 mm | Up to 1 mm |
| | Evaluation | A | A | B | C | B | C |
| | After 450 hours Appearance, Spread of permeation | No permeation | A | About ⅓ portion permeated on oxidation | About ⅓ portion permeated by cracking | About 3/5 portion permeated on oxidation | Wholly permeated |
| | Maximum depth of permeation | 0 mm | 0 mm | 3 mm | 3 mm | 4 mm | 7 mm |
| | Evaluation | A | A | C | C | C | C |
| Overall evaluation for resistances | | A | A | B | B | C | C |

The results shown in Table 2 reveal the followings.

The sintered bodies Nos. 4 to 10 corresponding to the sintered ceramic bodies of the present invention exhibit substantially complete resistance to erosion even when held over a prolonged period of time in contact with an aluminum alloy heated to an ultra-high temperature of 1000° C., the alloy being AC7B alloy in JIS H 5320 considered to have the highest reactivity.

On the other hand, the sintered body No. 1 free of flake graphite is low in resistance to spalling.

The sintered body No. 2 free of boron carbide, although having a surface portion of flake graphite to be directly in contact with molten metal, is oxidized and thus the molten metal permeates the sintered body therethrough, so that the sintered body as a whole is low in resistance to erosion.

Although the sintered body No. 3 contains flake graphite and boron carbide, the oxidation of flake graphite can not be fully prevented owing to the small ratio of boron carbide to flake graphite and thus the sintered body as a whole is low in resistance to erosion.

On the other hand, although the sintered body No. 9 contains flake graphite and boron carbide, the flake graphite present in excessive amount causes the permeation of molten metal due to oxidation, so that the sintered body is low in resistance to erosion.

Although the sintered body No. 10 contains flake graphite and boron carbide, the ratio of boron carbide to flake graphite is excessive and thus cracking arises in the sintered body and the molten metal permeates the body through the cracking, so that the sintered body is low in resistance to erosion.

As seen from the comparison with the sintered body No. 8 containing flake graphite, the sintered body No. 11 containing artificial graphite in place of flake graphite is comparable to the sintered body No. 8 in resistance to thermal spalling, but permits the permeation of molten metal, hence is susceptible to erosion. This is presumably because artificial graphite contains relatively more pores and is smaller in crystals than flake graphite.

Further, conventional products comprised of silicon carbide and silicon nitride are decidedly inferior to the products of the present invention in all respects.

EXAMPLE 2

A precursor for a protecting tube having a shape as shown in FIG. 1 (inside diameter 104 mm, height 550 mm, wall thickness 10 mm, outside diameter of the flange portion at the upper end 144 mm) was molded from the components for the sintered body No. 6 of Example 1 at a pressure of 800 kg/cm². The precursor was calcined under the same conditions as in Example 1, giving the protecting tube of the present invention. In the same manner as in Example 1, commercially available borosilicate frit particles slurried with silica sol was applied to the surface of the protecting tube to a film thickness of about 1 mm, followed by drying at 110° C.

Thereafter, the protecting tube thus obtained was attached to the immersion type heater as shown in FIG. 2. Two heaters of this type were installed in an aluminum-melting and -holding furnace of the type as shown in FIG. 3.

The furnace was charged with an aluminum casting alloy (ADC12 alloy in JIS H 5320) maintained at 680° C. The heaters were dipped in molten alloy to a depth of 450 mm.

A burner in the heater was retained at a calorific value of 4000 to 20000 kcal/hr by a PID control.

Under the foregoing conditions, the aluminum-melting and -holding furnace was continuously operated for 6 months. Thereafter the heaters were detached from the furnace and the protecting tubes were cut and checked for the degree of deterioration. More specifically, when the samples cut from the protecting tubes were analyzed by an X-ray micro-analyzer and according to X-ray diffraction, no permeation of aluminum from outside was found. And only a slight degree of oxidation was recognized in the interior of the samples.

In comparison, a conventional sintered body of silicon nitride-interlinked silicon carbide was used under the same conditions as above, and was found to have broken in 2 months.

When these broken materials were analyzed by an X-ray micro-analyzer and according to X-ray diffraction, the tests revealed that the permeation of aluminum from outside and oxidation markedly proceeded and that a large quantity of $SiO_2$ was produced.

When the conventional sintered body of silicon carbide was used under the same conditions as above, the sintered body broke in 7 days. The breakage was found attributable to the cracking formed by the impact due to thermal stress.

We claim:

1. A carbon-containing ceramic composite for molten non-ferrous metal, the composite being a sintered ceramic body to be used in contact with molten non-ferrous metal, the sintered body being characterized in that it comprises,
    (a) 100 parts by weight of aggregate of silicon carbide and/or silicon nitride,
    (b) 5 to 45 parts by weight of flake graphite, and
    (c) boron carbide in an amount of 10 to 40% by weight based on the flake graphite.

2. A protecting tube for molten non-ferrous metal, the tube being made of the carbon-containing ceramic composite as defined in claim 1.

3. A pipe for molten non-ferrous metal, the pipe being made of the carbon-containing ceramic composite as defined in claim 1.

4. An immersion-type heater for molten non-ferrous metal which is provided with the protecting tube, as an outer tube, made of the carbon-containing ceramic composite as defined in claim 1.

5. A furnace for melting non-ferrous metal which is provided with a heater including the protecting tube, as an outer tube, made of the carbon-containing ceramic composite as defined in claim 1.

* * * * *